United States Patent [19]
Kato et al.

[11] Patent Number: 4,750,071
[45] Date of Patent: Jun. 7, 1988

[54] MAGNETIC HEAD ASSEMBLY INCLUDING A PAIR OF HEADS DISPOSED IN THE VICINITY OF EACH OTHER

[75] Inventors: Minoru Kato; Yumiko Hamanaka, both of Chichibu, Japan

[73] Assignee: Canon Denshi Kabushiki Kaisha, Chichibu, Japan

[21] Appl. No.: 900,905

[22] Filed: Aug. 26, 1986

[30] Foreign Application Priority Data

Aug. 28, 1985 [JP]  Japan ................................ 60-187487
Oct. 29, 1985 [JP]  Japan ................................ 60-240613

[51] Int. Cl.⁴ ...................... G11B 5/265; G11B 5/187; G11B 5/10; G11B 5/17
[52] U.S. Cl. .................................... 360/121; 360/124; 360/129; 360/118
[58] Field of Search ............... 360/124, 118, 121, 125, 360/126, 120, 119, 59, 129

[56] References Cited

U.S. PATENT DOCUMENTS

| | | | |
|---|---|---|---|
| 3,846,840 | 11/1974 | Childers et al. | 360/118 |
| 3,947,891 | 3/1976 | Saito et al. | 360/118 |
| 4,100,584 | 7/1978 | Behr et al. | 360/125 |
| 4,317,148 | 2/1982 | Chi | 360/119 |
| 4,346,417 | 8/1982 | Griffith | 360/120 |
| 4,423,550 | 1/1984 | Fujioka et al. | 29/603 |
| 4,520,409 | 5/1985 | Kimoto et al. | 360/59 |
| 4,525,723 | 6/1985 | Nishimura et al. | 346/74.5 |

FOREIGN PATENT DOCUMENTS

| | | |
|---|---|---|
| 42302 | 3/1980 | Japan . |
| 54624 | 5/1981 | Japan . |
| 186222 | 11/1982 | Japan . |
| 108023 | 6/1983 | Japan . |
| 125224 | 7/1983 | Japan . |
| 17172 | 10/1983 | Japan . |
| 104310 | 5/1986 | Japan . |
| 16213 | 1/1987 | Japan . |

OTHER PUBLICATIONS

Shew, "Increased Density Magnetic Recording" IBM Technical Disclosure Bulletin, vol. 2, No. 2, Aug. 1959, p. 35.

Primary Examiner—John H. Wolff
Assistant Examiner—Matthew J. Bussan
Attorney, Agent, or Firm—Spencer & Frank

[57] ABSTRACT

A magnetic head comprises a first magnetic core having a first gap on an exposed surface side; a second magnetic core having a second gap on an exposed surface side forming an identical surface with an exposed surface of the first magnetic core, and disposed in the vicinity of the first magnetic core; and a magnetic film disposed in the vicinity of the second magnetic core and for magnetically short-circuiting a magnetic circuit of the second magnetic core without passing through a coil wound around the second magnetic core. The magnetic film prevents crosstalk to the first magnetic core from the second magnetic core.

9 Claims, 6 Drawing Sheets

MAGNETIC HEAD ASSEMBLY INCLUDING A PAIR OF HEADS DISPOSED IN THE VICINITY OF EACH OTHER

BACKGROUND OF THE INVENTION

1. Field of the Invention

The present invention relates to a magnetic head, and more particularly to an induction-type magnetic head having a first magnetic core and a second magnetic core disposed in the vicinity of the first magnetic core and generating a magnetic flux larger than that of the first magnetic core 2. Description of the Prior Art As an example of this type of magnetic head, known is a so-called tunnel erasing type magnetic head used in a magnetic disc apparatus for recording and/or reproducing data on and/or from a magnetic recording medium such as a magnetic disc and having a recording and/or reproducing core and an erasing core for erasing both outside portions of a track on which recording has been performed by the recording and/or reproducing core, the cores being disposed close to each other along a rotating direction of the magnetic disc.

An arrangement of a conventional tunnel erasing type magnetic head is constructed as shown in FIGS. 1 and 2 or in FIG. 3.

FIGS. 1 and 2 show a magnetic head having a core arrangement known generally as a bulk type.

In FIG. 1, reference numerals 1a and 1b denote respectively front core halves of a recording and/or reproducing core 1. The front core halves 1a and 1b have upper edge portions adhered to each other. A magnetic gap 2 for recording and/or reproducing is formed in the adhesion portion exposed in an upper edge surface that is disposed opposite a magnetic disc. An adhesive such as adhesive glass 2a is exposed on both sides of the magnetic gap 2. The distance between the adhesives 2a and 2a corresponds to the width of the recording and-/or reproducing track. Reference numerals 3a and 3b denote front core halves of an erasing core 3. The front core halves 3a and 3b are adhered to each other in the same manner, and magnetic gaps 4 and 4' for erasing are formed on both outside portions of the adhesion portion exposed on an opposing surface thereof which is to face the magnetic disc.

An adhesive 4a such as adhesive glass is exposed between the magnetic gaps 4 and 4'. The width between the adhesives 4a and 4a is substantially the same as the distance between the above-mentioned adhesives 2a and 2a.

The core halves 1b and 3b are adhered to each other via a spacer plate 5 made of a non-magnetic material such as glass or ceramic, so that the pairs of the core halves 1a and 1b, and 3a and 3b are integrated. In this arrangement, the erasing magnetic gaps 4 and 4' are disposed to sandwich the recording and/or reproducing magnetic gap 2 when seen along the rotating direction of a disc not shown.

Of the core halves 1a and 1b, and 3a and 3b which have been integrated in this manner, a bobbin 7 having a coil 8 wound therearound is inserted into the core half 1a and a bobbin 9 having a coil 10 wound therearound is inserted into the core half 3a.

Furthermore, a compound back core 6 is formed integrally by a spacer plate 6c made from a non-magnetic material being sandwiched by back cores 6a and 6b. The spacer plate 6c is disposed at a position corresponding to that of the spacer plate 5. The back cores 6a and 6b are adhered to the bottom edge portions of the core halves 1a and 1b, and 3a and 3b respectively. The magnetic circuit of the recording and/or reproducing core 1 is formed by the core halves 1a and 1b, and the back core 6a. The magnetic circuit of the erasing core 3 is formed by the core halves 3a and 3b and the back core 6b.

Reference numerals 11 and 12 in FIG. 1 denote sliders that support the recording and/or reproducing core 1 and the erasing core 3, respectively, to reinforce the cores 1 and 3 and at the same time to stabilize a facing relationship of the cores 1 and 3 with the magnetic disc. The sliders 11 and 12 have grooves 11b and 12b for accommodating the bobbins 7 and 9, respectively, so that their cross-sections are formed into a block with a substantially L-shaped profile. The upper surfaces of the sliders 11 and 12 are formed into facing surfaces 11a and 12a which face the magnetic disc. The sliders 11 and 12 are attached to the side surfaces of both the recording and/or reproducing core 1 and the erasing core 3, so that the overall arrangement of a magnetic head 15 is completed, as shown in FIG. 2.

As shown in FIG. 2, in the magnetic head 15, the portions of the sliders 11 and 12 are adhered and fixed to an elastic plate such as a gimbal spring 13 that functions as a supporting member. The magnetic head 15 is attached to a magnetic disc apparatus not shown through the elastic plate 13.

This elastic plate 13 has extended holes 13a formed substantially into an L-shape so as to surround a central portion of the plate 13. An opening 13b is formed into this central portion to engage the bottom portion of the magnetic head 15.

The terminals 8a and 8b, and 10a and 10b of the coils 8 and 10 of the magnetic head 15 are connected to a flexible printed circuit board 14 for connecting the magnetic head 15 to an external circuit.

FIG. 3 shows a magnetic head with a core arrangement known generally as a laminated type. The differences between this head and the head shown in FIGS. 1 and 2 are in the arrangement of the coil, the arrangement of the sliders and the position at which the coil is attached.

That is, a magnetic head 22 shown in FIG. 3 has two erasing cores denoted by reference numerals 3 and 3'. These erasing cores 3 and 3' are sandwiched and supported from both sides by sliders 20 and 21 interposing a spacer plate 17 having the same thickness as the recording and/or reproducing core 1. Furthermore, the recording and/or reproducing core 1 is sandwiched and supported by sliders 20 and 21 interposing spacer plates 16 and 16' having the same thickness as the erasing cores 3 and 3', respectively. Further, the recording and/or reproducing core 1 is adhered to the spacer plate 17, and the spacer plates 16 and 16' are adhered to the erasing cores 3 and 3', in such a way that seen from the direction of arrow A, the magnetic gaps 4 and 4' in the erasing cores 3 and 3' sandwich the magnetic gap 2 in the recording and/or reproducing core 1.

Moreover, the sliders 20 and 21 do not have grooves to accommodate the coils (bobbins) of both the cores as in the example described above, so that the sliders 20 and 21 are attached to the erasing cores 3 and 3' and the spacer plates 16 and 16' without gap. Accordingly, the coils not shown are engaged with portions of the cores protruding into the lower side of the elastic plate 13.

When reproducing is performed by the magnetic head having the arrangement described above, variations in environmental conditions may cause displacements in the relative positions between the magnetic head and the track on the magnetic disc, resulting in the following problems.

For example, when the recording and/or reproducing magnetic gap 2 is reproducing a track R1 on the magnetic disc on which data has already been recorded as shown in FIG. 4, this type of displacement in position may cause one or both of the erasing magnetic gaps 4 and 4' (in this example the gap 4) to be erroneously positioned on an adjacent track R2.

In such a situation, a reproducing magnetic flux from the track R2 will pass through the erasing core 3. The linkage of the magnetic flux to the coil 10 of the erasing core 3 will induce a voltage across the coil 10. That is, the erasing core 3 will erroneously cause reproduction of the signal on the track R2.

Furthermore, since the erasing core 3 and the recording and/or reproducing core 1 are extremely close to each other, the thus reproduced signal from the erasing core 3 will leak to the recording and/or reproducing core 1 as crosstalk and be picked up by that core. As a result, the signal from the track R1 and the signal from the adjacent track R2 will overlap in the recording and/or reproducing core 1 and be reproduced. This results in the problem of diminished reliability of the reproduced data.

SUMMARY OF THE INVENTION

It is, therefore, an object of the present invention to provide a magnetic head that can solve the above-mentioned problems by preventing crosstalk between the cores and can supply reproduced data without error.

To solve the above-mentioned problems, in a first feature of the present invention, an induction type magnetic head has a first magnetic core, a second magnetic core through which a magnetic flux larger than that of the first magnetic core passes and which is disposed in the vicinity of the first magnetic core, and a magnetic member for coupling magnetically a magnetic circuit of the second magnetic core in an area closer to a surface facing a magnetic recording medium than to a coil wound around the second magnetic core.

In the above arrangement, a magnetic flux flowing through the second magnetic core while the first magnetic core is being used flows principally in a portion of the magnetic circuit coupled (short-circuited) magnetically to the second magnetic core through the magnetic member in an area closer to the side of the surface opposing a magnetic recording medium than to the second magnetic core. This arrangement prevents the induction of a voltage across the coil, because very little magnetic flux flows into and links with the coil of the second magnetic core, thereby preventing crosstalk to the first magnetic core.

In a second feature of the present invention, a magnetic connecting portion is disposed on one of two portions of the second core half which integrally forms the second core. The magnetic connecting portion contacts the other core half. A heating element is positioned in the vicinity of this connecting portion to solve the above problems.

In the arrangement described above, even if the second head core picks up a magnetic flux from the recording medium, this magnetic flux is directed to a closed magnetic loop containing the connecting portion, so that it is possible to prevent the magnetic flux from being directed to a magnetic path of the winding of the coil of the second head core, thereby preventing crosstalk.

When electromagnetic conversion is performed by the second core, electrical power is supplied to the heating element so that the connecting portion is heated substantially to the Curie point. As a consequence, the permeability of the connecting portion is reduced and accordingly the magnetic resistance increases. This prevents formation of a closed magnetic loop including the connecting portion, and thus allows the magnetic flux to be induced from the closed magnetic loop in the coil winding.

In the first aspect of the present invention, a magnetic head comprises:

a first magnetic core having a first gap on an exposed surface side;

a second magnetic core having a second gap on an exposed surface side forming an identical surface with an exposed surface of the first magnetic core, and disposed in the vicinity of the first magnetic core, the second magnetic core allowing a magnetic flux larger than that being able to pass through the first magnetic core; and a magnetic member for magnetically coupling a magnetic circuit of the second magnetic core without passing through a coil wound around the second magnetic core.

Here, the magnetic member can short-circuit magnetically the magnetic circuit. The magnetic member may be a magnetic film made from a high permeability magnetic material.

The magnetic head may further comprise a supporting member for supporting the first and the second magnetic cores, and the magnetic member can be disposed on the supporting member.

The magnetic member may be a magnetic film made from a high permeability magnetic material.

The magnetic member may alternatively be a magnetic thin plate made from a high permeability magnetic material, and the supporting member may have a groove in which the magnetic thin plate is disposed.

The first gap and the second gap may be parallel with each other and the second gap can be formed by two gaps sandwiching the first gap in a direction parallel to a parallel direction of the first and second gaps. A spacer can be inserted between the first and the second magnetic cores.

In the second aspect of the present invention, a magnetic head comprises:

a first magnetic core having a first gap on an exposed surface side;

a second magnetic core having a second gap on an exposed surface side forming an identical surface with an exposed surface of the first magnetic core, and disposed in the vicinity of the first magnetic core, the second magnetic core allowing a magnetic flux larger than that being able to pass through the first magnetic core;

a magnetic connecting member disposed in parallel with a magnetic circuit portion including the second gap on a side of the second magnetic core closer to the exposed surface than a coil wound around the second magnetic core; and a heating element disposed in the vicinity of the magnetic connecting member.

Here, the heating element may be mounted on the magnetic connecting member. The magnetic connecting member may be formed integrally with the second magnetic core.

The magnetic head may further comprise a supporting member for supporting the first and the second magnetic cores, and the magnetic member can be disposed on the supporting member.

The first gap and the second gap may be parallel with each other and the second gap is formed by two gaps sandwiching the first gap in a direction parallel to a parallel direction of the first and second gaps. A spacer can be inserted between the first and the second magnetic cores.

The above and other objects, effects, features and advantages of the present invention will become more apparent from the following description of preferred embodiments thereof taken in conjunction with the accompanying drawings.

DETAILED DESCRIPTION OF PREFERRED EMBODIMENTS

Figure 1:
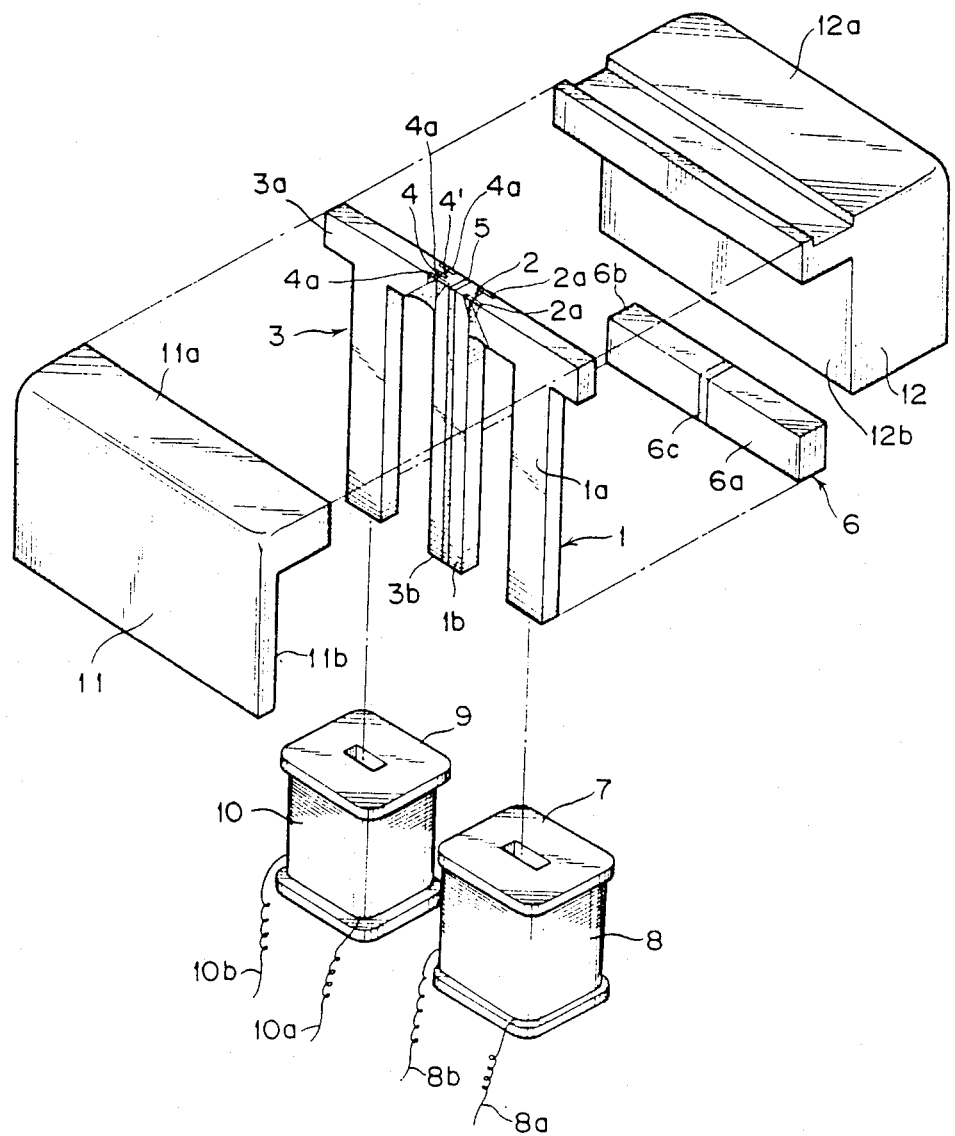
FIG. 1 is an exploded perspective view showing an example of a conventional magnetic head.

An explanation will be made of embodiments of the present invention in detail with reference to FIGS. 5-8. These embodiments use a bulk type core arrangement of a magnetic head for a magnetic disc apparatus as described above. Consequently, the same reference numerals are used for the same parts in FIGS. 5-8 as in FIGS. 1 and 2, and an explanation of such parts will be omitted.

First Embodiment

Figure 5:
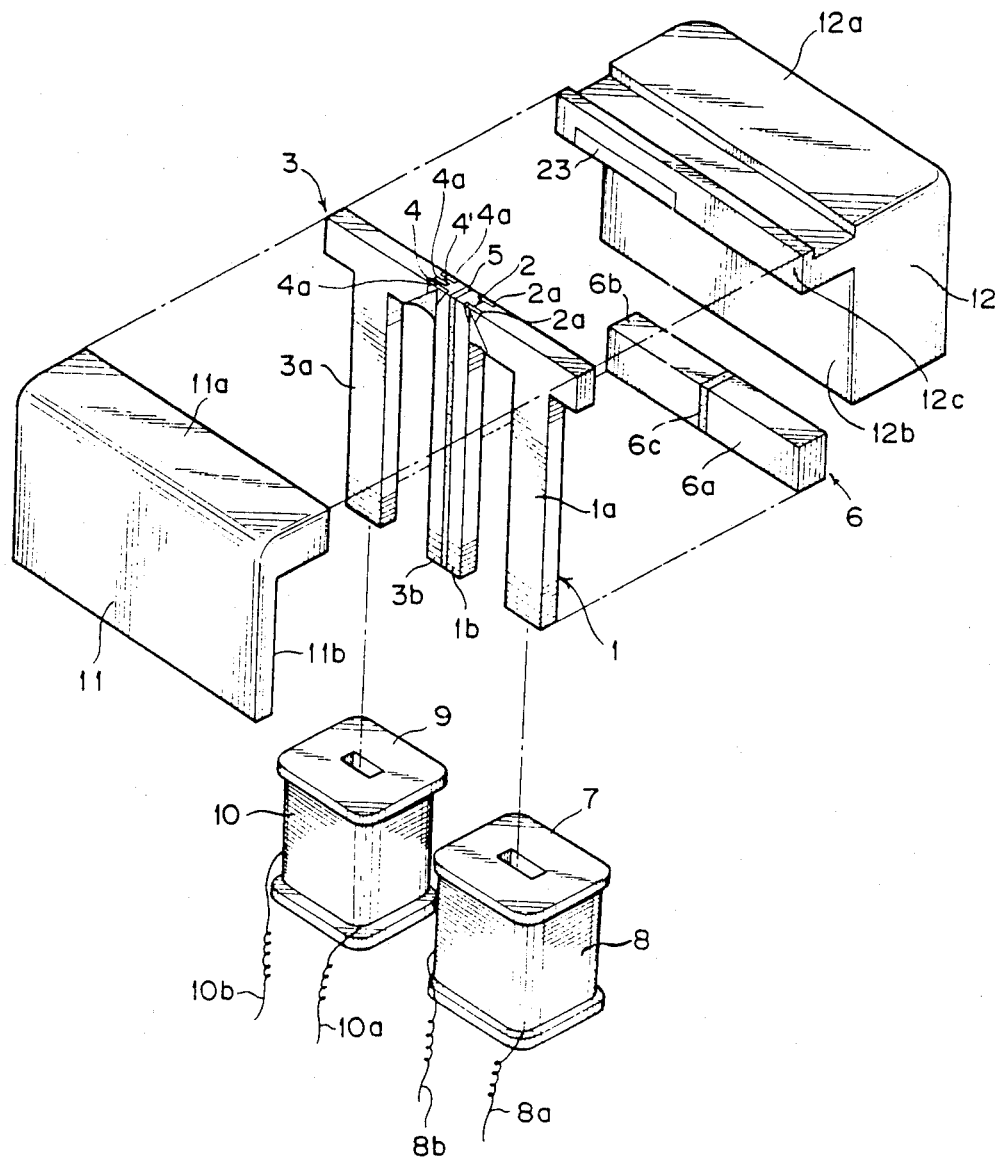
FIG. 5 is an exploded perspective view showing a first embodiment of a magnetic head according to the present invention.
Figure 6:
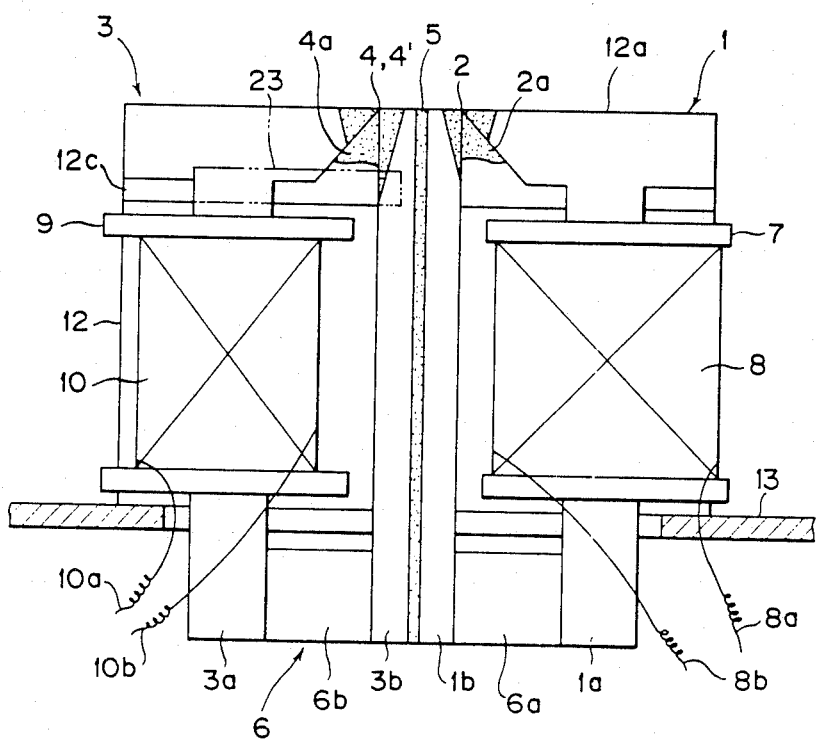
FIG. 6 is a transverse cross-sectional view of the magnetic head shown in FIG. 5.

FIG. 5 and FIG. 6 are an exploded perspective view and a cross-sectional view respectively of an arrangement of a magnetic head according to a first embodiment of the present invention.

As shown in the drawings, in the present embodiment, a magnetic film 23 is formed between the coil 10 and the gaps 4 and 4', that is on a contact surface 12c of the slider 12 which contacts side surfaces of the recording and/or reproducing core 1 and the erasing core 3. This feature differs from the conventional arrangement. The other portions and arrangements are the same as in the prior art arrangement shown in FIGS. 1 and 2.

The magnetic film 23 is formed to a thickness of about 500Å by depositing a high permability magnetic material such as permalloy on to the surface where the film is to be formed by a method such as sputtering or vacuum evaporation. In this example, the magnetic film 23 has a rectangular shape. As shown well in FIG. 6, the magnetic film 23 is disposed so as to contact only the erasing core 3. The magnetic film 23 is disposed so that its edge portions contact the core halves 3a and 3b in the area of the surface facing the magnetic disc above the bobbin 9 of the erasing core 3 in the drawing, that is on the side of the gaps 4 and 4'.

That is, in this embodiment, the magnetic circuit of the erasing core 3 is coupled, i.e., short-circuited magnetically through the magnetic film 23 in the area between the coil 10 and the gaps 4 and 4'.

Further, the magnetic film 23 may be disposed in the same manner as described above on the side of the slider 11, or on both the sliders 11 and 12.

Figure 4:
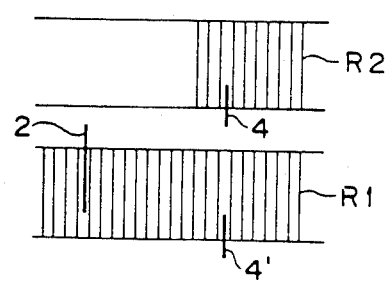
FIG. 4 is an explanatory drawing explaining a displacement in track positions with a conventional magnetic head.

In an arrangement such as that in the present embodiment, when during reproduction the displacement in track position as shown in FIG. 4 causes the magnetic flux of the track R2 which is adjacent to the track R1 to pass the erasing core 3 through the magnetic gaps 4 and 4' while the track R1 is being reproduced, the magnetic flux mainly flows through the magnetic circuit portion which is short-circuited magnetically by the magnetic film 23 on the side closer to the magnetic disc opposing surface rather than the coil 10. For this reason, the magnetic flux hardly links to the coil 10, so that no voltage is induced across the coil 10. That is, the reproduction of the signal on the adjacent track R2 will not be performed. Accordingly, crosstalk to the magnetic core 1 is prevented.

Furthermore, during erasing, a magnetic flux much larger than that during reproduction passes through the erasing core 3. In this situation, because the cross-sectional area of the magnetic film 23 is extremely small, it is saturated immediately and its magnetic resistance becomes large, so that the magnetic film 23 does not allow a flow of a large magnetic flux. As a result, the magnetic film 23 does not cause loss when performing erasing.

Figure 3:
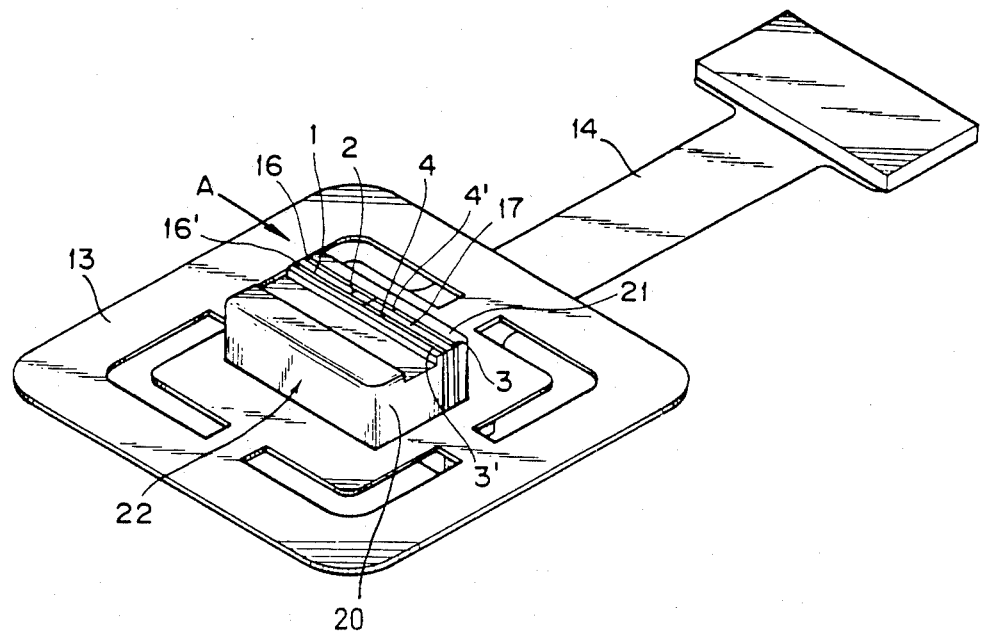
FIG. 3 is a perspective view showing another example of a conventional magnetic head.

The arrangement in which the magnetic film 23 is disposed can also be applied, of course, to a magnetic head having a core arrangement of the laminated type as shown in FIG. 3. In this case, however, it is necessary to dispose two magnetic films corresponding to the two erasing cores in this arrangement on both the sliders 20 and 21 at the same positions as described above.

Second Embodiment

Figure 7:
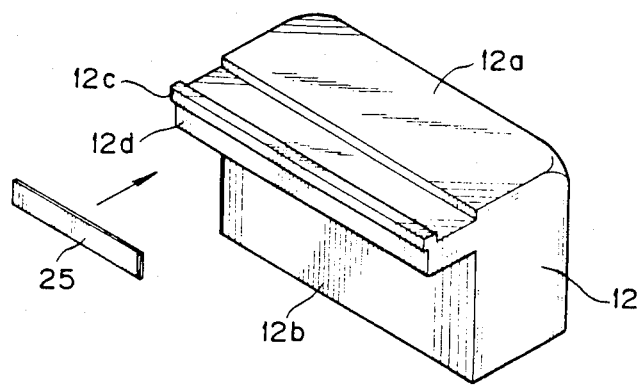
FIG. 7 is a perspective view showing a second embodiment of a magnetic head according to the present invention.

FIG. 7 shows a second embodiment of the present invention.

In FIG. 7, reference numeral 25 denotes a magnetic thin plate made of a high permeability magnetic material. Except for its thicker thickness, this thin plate 25 is formed in a rectangular shape having the same dimensions as the above-mentioned magnetic film 23. As shown in FIG. 7, this magnetic thin plate 25 is adhered and fixed to the contact surface 12c of the slider 12 at a position corresponding to the magnetic film 23. However, in a lower area of the contact surface 12c to which the thin magnetic plate 25 is fixed is formed a groove 12d whose depth corresponds to the thickness of the magnetic thin plate 25. The thin magnetic plate 25 is fixed to this groove portion 12d. Other portions of this arrangement are the same as those in the first embodiment.

In this embodiment, the magnetic thin plate 25 functions in the same manner as the magnetic film 23 in the first embodiment and produces the same effects.

The arrangement as described above in which a high permeability magnetic member such as the magnetic film 23 or the magnetic thin plate 25 short-circuits magnetically a magnetic circuit in the magnetic core in an area closer to a surface facing a magnetic recording medium rather than to the coil is not limited to the tunnel erasing type magnetic head, but can also be applied to any kind of induction type magnetic head described above. For example, by disposing the above-mentioned high permeability magnetic member in relation to a recording core of a magnetic head of the so-called read-after-write type in which the recording core and a reproducing core are disposed in the vicinity of each other the same effects as described above are obtained, thereby making it possible to prevent crosstalk from the recording core to the reproducing core during reproduction.

As is clear from the above explanation, in an induction type magnetic head having a first magnetic core and a second magnetic core which is disposed in the vicinity of the first magnetic head and through which a magnetic flux larger than that in the first magnetic core flows, the first or second embodiment provides the magnetic member which is disposed so as to couple magnetically with the magnetic circuit in the second magnetic core in the area closer to the surface facing a magnetic recording medium than to the coil wound around the second magnetic core. This arrangement directs the magnetic flux flowing through the second magnetic core principally to the above-mentioned magnetic member when the first magnetic core is being used, thereby making it possible to prevent crosstalk to the first magnetic core. Consequently, electromagnetic conversion can be performed suitably without error by the first magnetic core, and thus the reliability of a magnetic recording and/or reproducing apparatus can be improved by using this arrangement.

Third Embodiment

Figure 2:
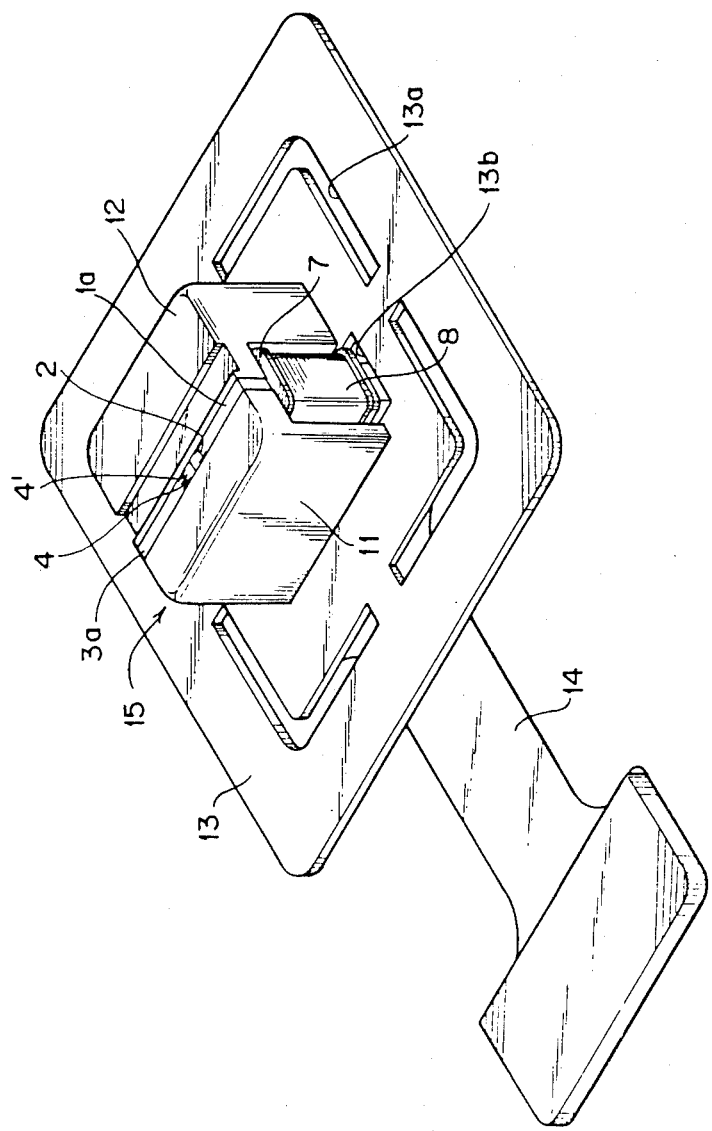
FIG. 2 is a perspective view showing an assembled condition of the magnetic head shown in FIG. 1.
Figure 8:
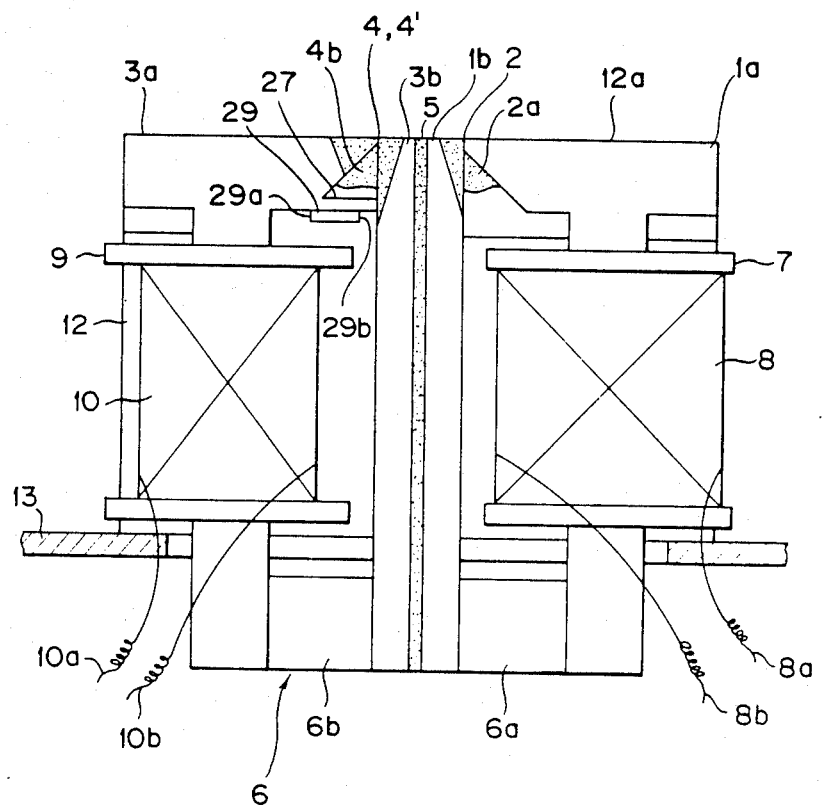
FIG. 8 is a side view showing a third embodiment of a magnetic head according to the present invention.

FIG. 8 is a side view showing an embodiment of a magnetic head according to the present invention in which the sliders have been removed and the magnetic core is viewed from the left hand side in FIG. 1.

In the present embodiment, on the side that the erasing core half 3a confronts with the erasing core half 3b, extended portions 27 are provided so that the extended portions 27 extends from the erasing core half 3a to the positions corresponding respectively to the gaps 4 and 4'. The extended portions 27 contact the erasing core half 3b. That is, the extended portions 27 are disposed in parallel with portions having magnetic circuits including the gaps 4 and 4', respectively.

Furthermore, a heating element 29 is disposed respectively to make contact with, or in the vicinity of the extended portion 27. In FIG. 8, lead wires and so on for supplying electrical power to the heating element 29 to heat this heating element 29 are omitted except terminals 29a and 29b connected to the heating element 29.

Next, an explanation will be made of operations of the present embodiment having the arrangement described above.

During reproduction, when a displacement occurs between the positions of the magnetic head and the magnetic recording medium and the erasing gap overlaps with the adjoining data track R2 as shown in FIG. 4, the magnetic flux generated from the data track R2 is directed to the erasing core side, but is not directed to the erasing coil side. Instead of this, the magnetic flux is directed to a closed magnetic loop that passes through the extended portion 27, through the magnetic gap 4 (4') and through the erasing core half 3b.

Consequently, no crosstalk occurs.

On the other hand, during erasing, electrical power is supplied, either jointly with or separately from the erasing coil 10, to the heating element 29 via the terminals 29a and 29b so that the heating element 29 is heated. As a result, the extended portion 27 is heated up substantially to the Curie point. Consequently, the permeability $\mu$ of the extended portion 27 is reduced, and the magnetic resistance thereof rises, so that the magnetic loop as described above, is not formed, and therefore the erasing magnetic flux is directed to the erasing gaps 4 and 4'.

While in the above embodiments, the first core is used as the recording and/or reproducing core and the second core is used as the erasing core, it should be noted that the same effects can be obtained, if the present invention is applied to a magnetic head having, for example, a first magnetic core as a reproducing core and a second magnetic core as a recording core.

As is clear from the above explanation, the present embodiment uses an arrangement in which the magnetic connecting portion is extended from one half to another half of the magnetic core performing high-energy electromagnetic conversion and the connecting portion contacts the other half. The heating element is disposed in the vicinity of this connecting portion. This arrangement makes it possible to direct a magnetic flux picked up by a second magnetic core to the closed magnetic loop formed with the connecting portion, and thus crosstalk is prevented when the first magnetic core is used.

What is claimed is:

1. A magnetic head assembly for use with a magnetic record bearing medium comprising
   (a) a first magnetic head including
     first and second core members;
     a first magnetic gap interposed between said first and second core members, said first magnetic gap having an exposed surface facing said magnetic record bearing medium; and
     a first coil wound around said first core member;
   (b) a second magnetic head disposed in the vicinity of said first magnetic head, said second magnetic head including
     third and fourth core members;
     a second magnetic gap interposed between said third and fourth core members, said second magnetic gap having an exposed surface facing said magnetic record bearing medium; and
     a second coil wound around said third core member, said second coil being adjacent the exposed surface of said second magnetic gap; and
   (c) a magnetic member contacting said third and fourth core members, said magnetic member being closer to the exposed surface of said second magnetic gap than said second coil, said magnetic member by-passing the magnetic circuit formed by said third and fourth core members and said second magnetic gap.

2. A magnetic head assembly as claimed in claim 1, wherein said magnetic member is a magnetic film made from a high permeability magnetic material.

3. A magnetic head assembly as claimed in claim 1, further comprising a supporting member for supporting said first and said second magnetic cores, said magnetic member being disposed on said supporting member.

4. A magnetic head assembly as claimed in claim 3, wherein said magnetic member is a magnetic film made from a high permeability magnetic material.

5. A magnetic head assembly as claimed in claim 3, wherein said magnetic member is a magnetic thin plate made from a high permeability magnetic material, and wherein said supporting member has a groove in which said magnetic thin plate is disposed.

6. A magnetic head assembly as claimed in claim 1, wherein said first and second magnetic gaps are parallel with each other, said second magnetic gap is formed by two magnetic gaps sandwiching said first magnetic gap and extending in a direction parallel to the direction in which said first and second gaps extend, and wherein a spacer is located between said first and said second magnetic cores.

7. A magnetic head assembly as claimed in claim 1, further comprising a heating element disposed in the vicinity of said magnetic member.

8. A magnetic head assembly as claimed in claim 7, wherein said heating element is mounted on said magnetic member.

9. A magnetic head assembly as claimed in claim 1, wherein said first magnetic head is arranged to record and/or reproduce signals on and/or from said magnetic record bearing medium, and said second magnetic head is arranged to erase signals recorded on said magnetic record bearing medium.

* * * * *